Patented July 6, 1943

2,323,714

UNITED STATES PATENT OFFICE 2,323,714

CHEMICAL PROCESS

James E. Kirby and James H. Werntz, Brandywine Hundred, Del., assignors to E. I. du Pont de Nemours & Company, Wilmington, Del., a corporation of Delaware No Drawing. Application June 25, 1941, Serial No. 399,734

8 Claims. (Cl. 260—508)

This invention relates to improvements in the preparation of aminopropanesulfonates and more particularly to the preparation of these compounds from N-allylamines.

This invention has as an object to provide an economical method of preparing aminopropanesulfonates. A further object is to discover catalysts which promote the reaction between N-allylamines and water-soluble bisulfites. A still further object is to find the optimum conditions under which N-allylamines react with water-soluble bisulfites to give aminopropanesulfonates. Other objects will appear hereinafter.

These objects are accomplished by the following invention in accordance with which an organic amine containing an allyl group attached to a basic nitrogen atom is reacted with a compound capable of supplying bisulfite ions.

Salts of aminopropanesulfonic acids are readily prepared by reacting an N-allylamine with a bisulfite. Sodium bisulfite is a satisfactory reagent to employ since the sodium salts of the resulting aminopropanesulfonic acids are readily recovered in a high state of purity by simply crystallizing from hot water. Ammonium bisulfite is equally as satisfactory. The reactions are often carried out in water, and since the allylamines are usually insoluble therein good stirring is employed to insure good contact with the bisulfite reagents. The extent of the reaction may be followed by determining the amount of insoluble allylamine which remains after the reaction has proceeded for some time. Best results are obtained when a nascent form of oxygen such as that supplied by an organic peroxide is employed as a catalyst.

In the following examples which illustrate but do not limit the invention the parts are given by weight.

Example I

Ammonium 3-anilino-1-propanesulfonate.—One hundred thirty-three parts of N-allylaniline, 320 parts of an aqueous solution containing 47% of ammonium bisulfite, 1000 parts of water, and 20 parts of ascaridole were stirred together in a reaction vessel at room temperature for about four days. An insoluble oil layer was separated and weighed, indicating that 73% of the N-allylaniline had been sulfonated.

Example II

Sodium 3-anilino-1-propanesulfonate.—One hundred parts of N-allylaniline, 170 parts of sodium bisulfite of 65% purity, 1000 parts of water, and 10 parts of ascaridole were stirred while exposing to air in a reaction vessel at room temperature for four days. The small insoluble oil layer which separated indicated a reaction of 90%. When a nitrogen atmosphere was substituted for air but otherwise under identical conditions, the conversion was 100%; when no ascaridole was used the conversion with air was 42%; with nitrogen 40%. The product was isolated by adding sodium chloride to the aqueous solution and concentrating to about 25% of the original volume. On cooling, 82 parts of product separated as a light grayish colored powder. Analytically pure sodium 3-anilino-1-propanesulfonate may be obtained as white plates by recrystallization from concentrated solutions in water. The product analyzed 13.7% sulfur, which is close to the theoretical sulfur content of 13.5%.

Example III

Barium 3-anilino-1-propanesulfonate.—A mixture of 4 parts of N-allylaniline, 6 parts of ammonium bisulfite, 54 parts of water and 0.2 part of benzoyl peroxide was agitated at 60° C. for 100 hours. Then the mixture was diluted with water and boiled with an excess of barium hydroxide until no more ammonia was evolved. The suspension was filtered; the filtrate was treated with carbon dioxide until the excess barium hydroxide was removed. The suspension was filtered again, and the filtrate evaporated to dryness on a water bath. The syrupy residue which remained crystallized on cooling. The product was filtered, sucked as dry as possible, and washed with alcohol. The yield was 87% of theory.

When the above experiment was repeated using 34 parts of water and 34 parts of acetic acid in place of 54 parts of water and 0.2 part of ascaridole in place of 0.2 part of benzoyl peroxide a somewhat smaller yield of the barium salt was obtained.

Example IV

Barium 3-ortho-toluidino-1-propanesulfonate.—A mixture of 20 parts of N-allyl-o-toluidine, 33.7 parts of ammonium bisulfite, 500 parts of water and 0.3 part of ascaridole was held at 60° C. under high-speed agitation for 50 hours. A slow stream of air was passed through the solution during the reaction. At the end of this time the solution was freed of organic liquids by means of a separatory funnel. The aqueous solution was treated with an excess of barium hydroxide and boiled until its vapors no longer turned Brilliant Yellow paper red. The solution then was filtered; carbon dioxide was bubbled through the filtrate until all excess barium hydroxide had been precipitated as barium carbonate. The mixture was filtered again; the filtrate was concentrated to a small volume. Barium 3-ortho-toluidino-1-propanesulfonate separated out. The yield was 54.6% of theory.

Preferred catalysts for this reaction are the "per" compounds of inorganic and organic chemistry. Effective organic "per" compounds include ascaridole, acetyl peroxide, benzoyl peroxide, lauroyl peroxide, peracetic acid, etc. Useful inorganic "per" compounds include hydrogen peroxide, sodium peroxide, sodium perborate, perboric acid, sodium percarbonate, ammonium persulfate, etc. The organic "per" compounds are the preferred class of catalysts. For example, ascaridole is more effective than ammonium persulfate. Other catalytic agents include ozonides of olefines, acetaldehyde stored in contact with air, nitric acid, nitric oxide, nitrogen dioxide, potassium dichromate, silver sulfite, silver nitrate, ammonium nitrate, sodium nitrite, magnesium perchlorate, perchloric acid, sodium chlorate, etc.

In addition to the active catalysts, we may use such auxiliary materials as will promote better contact between the components of the reaction mixture. For example, addition of an emulsifying agent appears to accelerate the rate of reaction apparently as a result of improved contact between the components of the reaction mixture. In connection with the active catalysts we may use, in addition, promoter catalysts or the active catalysts may be deposited on the promoter catalysts. As promoter catalysts we mean to include such activating materials as kieselguhr, kaolin, pulverized charcoal, gas carbon black, powdered silica gel, vermiculite, diatomaceous earth, fuller's earth, Japanese acid clay, bentonite, and natural silicates such as, Indianaite.

The sulfonation of allylamines with bisulfite proceeds slowly and at about the same rate in a nitrogen atmosphere and in air. However, when nascent oxygen supplied by a "per" compound is added as a catalyst, the reaction rate is materially increased, and in the same time interval yields of about 90% are obtained in air and 100% in nitrogen.

The reaction may be carried out at temperatures ranging from below 0° C. up to and including 175° C. Since water or alcohol are the preferred solvents for the reaction, temperatures lower than 0° C. may be used but not so low as to cause the solvent medium to freeze. When operating at temperatures above the boiling point of water or of the alcohol employed as the solvent medium, it is necessary to operate under pressure. Thus, in experiments at 150° C. the reactions are carried out in sealed metal bombs.

When operating in water solutions, the preferred pH range is pH 2 to pH 6.9. There is substantially less oxidation of the bisulfite at pH 6 than at pH 3. Under certain conditions the reaction becomes more acidic and it is frequently desirable to add a buffeting agent in order to maintain the pH at a constant figure. We prefer to operate in the range pH 3 to pH 6.

While any polar solvent or solvents which promote formation of bisulfite ions may be used, water, aqueous acetic acid, methanol, methanol-water, ethanol-water, and ethanol are excellent solvents for carrying out the reaction and are preferred. The type of solvent to be employed depends upon the temperature to be used and upon the reactants. Water is the best solvent when using sodium bisulfite, since the sodium sulfonate of the amine is readily recovered from its concentrated solution. When unsaturated amines are used which are quite insoluble in water, it is sometimes better to employ a 50% aqueous solution of acetic acid, an alcohol or a mixture of an alcohol and water as the solvent. Methanol and ethanol are preferred to dimethylformamide, ethyl ether, and dioxane as solvents because of the higher solubility of sodium bisulfite in the alcohols and the higher efficiency of the alcohols.

Any water-soluble bisulfite or compound capable of yielding bisulfite ions ($HSO_3$) may be employed in the reaction. While we have usually used sodium bisulfite, ammonium bisulfite and aniline bisulfite, we may also employ dimethylamine bisulfite, methylamine bisulfite, dimethylaniline bisulfite, pyridine bisulfite, triethanolamine bisulfite, calcium bisulfite, potassium bisulfite, etc. When dilute aqueous sulfurous acid is employed, the allylamine bisulfite which is formed is capable of reacting with more allylamine to form the sulfonic acid derivative.

A few examples of allylamines which may be sulfonated by means of bisulfite include allylamine itself, diallylamine, allylmethylamine, allyldimethylamine, allyldodecylamine, allyldihexadecylamine, N-allylaniline, N-methyl-N-allylaniline, N-allyl-p-toluidine, N-allyl-p-anisidine, N,N'-diallyl-p-phenylenediamine, N-allyl-alpha-naphthylamine, N-allyl-beta-naphthylamine, N-allyl-N-cyclohexylamine, N-allyl-p-nitroaniline, N-allyl-o-chloroaniline, N-allyl-1-aminobenzothiazole, N-allyl-1-aminoanthraquinone, N-alylglycine, N-allyl-p-aminobenzoic acid, N-allylanthranilic acid, N-allyl-sulfanilic acid, p-(allylamino) benzenesulfonamide, etc. The secondary N-allyl monocyclic aromatic amines are the preferred class.

Suitable high speed agitation of the reaction mixture is frequently necessary for successful results.

The expression aminopropanesulfonates is used to embrace the free sulfonic acids as well as the salts of these sulfonic acids. This invention is especially useful in providing a direct route to water-soluble salts of aminopropane sulfonic acids. If desired, the water-soluble salts such as sodium, ammonium, etc. may be converted to and isolated as less water-soluble salts, as for example, the barium or calcium salts. The free sulfonic acids are obtained by treating the barium or calcium sulfonates with sulfuric acid or orthophosphoric acid. The free sulfonic acids may also be prepared by passing hydrogen chloride into an ether suspension of a salt.

The concentration of sulfurous acid in water should not exceed 20% and preferably not 10%. In general, we prefer to employ the acid salts of sulfurous acid to free sulfurous acid. While we may use 40% aqueous solutions of sodium bisulfite we prefer to use concentrations of about 20% or less.

Resort may be had to such variations as fall within the spirit of the invention and the scope of the appended claims.

We claim:

1. A process for the preparation of an aminopropanesulfonate which comprises reacting an organic amine containing an allyl group attached to a basic nitrogen atom with a water-soluble compound capable of yielding bisulfite ions in the presence of a catalytic amount of an oxidizing agent.

2. A process for the preparation of an aminopropanesulfonate which comprises reacting an N-allylamine with a water-soluble bisulfite in the presence of a catalytic amount of nascent oxygen.

3. A process as defined in claim 1 in which the amine is a secondary N-allyl monocyclic aryl amine.

4. A process as defined in claim 2 in which the water-soluble bisulfite which is used is selected from the group consisting of sodium bisulfite and ammonium bisulfite.

5. A process of preparing a secondary aryl amino propane sulfonate which comprises reacting a secondary N-allyl monocyclic aryl amine with a water-soluble bisulfite in the presence of a catalytic amount of an organic peroxide.

6. A process as defined in claim 2 in which the N-allylamine is N-allylaniline.

7. A process of making ammonium 3-anilino-1-propanesulfonate which comprises stirring an aqueous reaction mixture containing N-allylaniline, ammonium bisulfite and ascaridole.

8. A process of making sodium 3-anilino-1-propanesulfonate which comprises stirring an aqueous reaction mixture containing N-allylaniline, sodium bisulfite and ascaridole.

JAMES E. KIRBY.
JAMES H. WERNTZ.